United States Patent
Fadli

(10) Patent No.: US 10,789,612 B2
(45) Date of Patent: *Sep. 29, 2020

(54) UNIVERSAL IDENTIFICATION

(71) Applicant: MMS USA HOLDINGS INC., Seattle, WA (US)

(72) Inventor: Samih Fadli, Seattle, WA (US)

(73) Assignee: MMS USA HOLDINGS INC., Seattle, WA (US)

(*) Notice: Subject to any disclaimer, the term of this patent is extended or adjusted under 35 U.S.C. 154(b) by 593 days.

This patent is subject to a terminal disclaimer.

(21) Appl. No.: 15/269,642

(22) Filed: Sep. 19, 2016

(65) Prior Publication Data

US 2017/0083916 A1   Mar. 23, 2017

Related U.S. Application Data

(60) Provisional application No. 62/220,727, filed on Sep. 18, 2015, provisional application No. 62/288,763, filed on Jan. 29, 2016.

(51) Int. Cl.
*G06Q 30/02* (2012.01)
*G06N 20/00* (2019.01)
(Continued)

(52) U.S. Cl.
CPC ......... *G06Q 30/0246* (2013.01); *G06N 20/00* (2019.01); *G06Q 20/4014* (2013.01); *G06Q 30/0201* (2013.01); *G06Q 30/0613* (2013.01)

(58) Field of Classification Search
CPC .............. G06N 20/00; G06Q 30/0246; G06Q 20/4014; G06Q 30/0201; G06Q 30/0613
See application file for complete search history.

(56) References Cited

U.S. PATENT DOCUMENTS 5,172,204 A   12/1992   Hartstein
5,293,457 A    3/1994   Arima
(Continued)

FOREIGN PATENT DOCUMENTS

JP   2011525257 A   9/2011
WO  2000042593 A1   7/2000

OTHER PUBLICATIONS

Darwiche, "Bayesian Networks," in The Handbook of Knowledge Representation 467-509 (Harmelen et al. eds. 2008). (Year: 2008).*

(Continued)

*Primary Examiner* — Kamran Afshar
*Assistant Examiner* — Ryan C Vaughn
(74) *Attorney, Agent, or Firm* — Loeb & Loeb LLP

(57) ABSTRACT

A universal identification graph algorithm connects identities across computing devices and digital channels to one customer. The universal identification allow marketers to engage customers with relevant brand experience as they move between devices and across all digital channels. The universal identification graph algorithm enables mapping of a customer's journey across multiple, different identifications, allows deep personalization based on behaviors, habits, and preferences across the entire customer journey, helps create a more comprehensive customer profile to enable marketers to target the customer with relevant content at the right time and through the right channels, and also provides the customer with the ability to quickly opt out.

8 Claims, 11 Drawing Sheets

(51) Int. Cl.
   *G06Q 20/40*           (2012.01)
   *G06Q 30/06*           (2012.01)

(56) References Cited

U.S. PATENT DOCUMENTS

| | | | |
|---|---|---|---|
| 5,845,051 A | 12/1998 | Oh | |
| 6,601,052 B1 | 7/2003 | Lee | |
| 6,714,975 B1 | 3/2004 | Aggarwal et al. | |
| 7,948,400 B2 | 5/2011 | Horvitz | |
| 8,655,821 B2 * | 2/2014 | Aliferis | G06N 20/00 706/46 |
| 9,336,483 B1 | 5/2016 | Abeysooriya | |
| 9,652,797 B2 | 5/2017 | Vijayaraghavan | |
| 9,866,695 B1 | 1/2018 | Modi | |
| 2003/0028451 A1 | 2/2003 | Ananian | |
| 2004/0003042 A1 * | 1/2004 | Horvitz | G06Q 10/109 709/204 |
| 2004/0103024 A1 | 5/2004 | Patel | |
| 2005/0273388 A1 | 12/2005 | Roetter | |
| 2005/0288954 A1 | 12/2005 | McCarthy | |
| 2006/0212350 A1 | 9/2006 | Ellis | |
| 2007/0033098 A1 | 2/2007 | Peters | |
| 2008/0126108 A1 | 5/2008 | Hodgin | |
| 2009/0106734 A1 | 4/2009 | Riesen et al. | |
| 2009/0119160 A1 | 5/2009 | Woda | |
| 2010/0042496 A1 | 2/2010 | Wang | |
| 2010/0082439 A9 | 4/2010 | Patel | |
| 2011/0040613 A1 | 2/2011 | Simmons | |
| 2011/0071900 A1 | 3/2011 | Kamath | |
| 2011/0191714 A1 | 8/2011 | Ting | |
| 2011/0307515 A1 | 12/2011 | Chen | |
| 2011/0320395 A1 | 12/2011 | Dada | |
| 2012/0054019 A1 | 3/2012 | Kitts | |
| 2012/0078708 A1 | 3/2012 | Taylor | |
| 2012/0259841 A1 | 10/2012 | Hsiao | |
| 2012/0259851 A1 | 10/2012 | Jia | |
| 2012/0259854 A1 | 10/2012 | Hsiao | |
| 2012/0259871 A1 | 10/2012 | Holmes | |
| 2012/0260185 A1 | 10/2012 | Choc | |
| 2012/0303447 A1 | 11/2012 | Hughes | |
| 2013/0021345 A1 | 1/2013 | Hsiao | |
| 2013/0041748 A1 | 2/2013 | Hsiao | |
| 2013/0054352 A1 | 2/2013 | Ferber | |
| 2013/0055137 A1 | 2/2013 | Choc | |
| 2013/0073388 A1 | 3/2013 | Heath | |
| 2013/0080362 A1 | 3/2013 | Chang et al. | |
| 2013/0124299 A1 | 5/2013 | Montgomery | |
| 2013/0129076 A1 | 5/2013 | Kannan | |
| 2013/0159227 A1 | 6/2013 | Dasgupta et al. | |
| 2013/0179440 A1 | 7/2013 | Gordon | |
| 2013/0253969 A1 | 9/2013 | Das | |
| 2013/0268468 A1 | 10/2013 | Vijayaraghavan | |
| 2013/0317993 A1 | 11/2013 | Wasserman | |
| 2014/0006293 A1 | 1/2014 | Chang et al. | |
| 2014/0089232 A1 | 3/2014 | Buibas | |
| 2014/0120864 A1 | 5/2014 | Manolarakis et al. | |
| 2014/0289038 A1 | 9/2014 | Hasson | |
| 2014/0379428 A1 | 12/2014 | Phansalkar | |
| 2015/0007081 A1 | 1/2015 | Hsiao | |
| 2015/0081597 A1 | 3/2015 | Chang et al. | |
| 2015/0154632 A1 | 6/2015 | Jindal | |
| 2015/0161625 A1 | 6/2015 | Heath | |
| 2015/0161648 A1 | 6/2015 | Heath | |
| 2015/0161652 A1 | 6/2015 | Schnabl | |
| 2015/0161654 A1 | 6/2015 | Little | |
| 2015/0161655 A1 | 6/2015 | Bidyuk | |
| 2015/0161657 A1 | 6/2015 | Bidyuk | |
| 2015/0163311 A1 | 6/2015 | Heath et al. | |
| 2015/0206178 A1 | 7/2015 | Roetter | |
| 2015/0220951 A1 * | 8/2015 | Kurapati | G06Q 30/0204 705/7.33 |
| 2015/0235240 A1 | 8/2015 | Chang et al. | |
| 2015/0262217 A1 | 9/2015 | Hoyne | |
| 2016/0027041 A1 | 1/2016 | Zhong | |
| 2016/0034948 A1 | 2/2016 | Zhong | |
| 2016/0071126 A1 | 3/2016 | Chang | |
| 2016/0078456 A1 | 3/2016 | Chakraborty | |
| 2016/0098735 A1 | 4/2016 | Sinha | |
| 2016/0210656 A1 | 7/2016 | Chittilappilly | |
| 2016/0217515 A1 | 7/2016 | Vijayaraghavan | |
| 2016/0267521 A1 | 9/2016 | Sankaran | |
| 2016/0342911 A1 | 11/2016 | Kannan | |
| 2016/0358232 A1 | 12/2016 | Wang | |
| 2016/0371703 A1 | 12/2016 | Monegan | |
| 2017/0024656 A1 | 1/2017 | Gilon | |
| 2017/0046732 A1 | 2/2017 | Elmachtoub | |
| 2017/0068985 A1 | 3/2017 | Singh | |
| 2017/0076357 A1 | 3/2017 | Peddinti | |
| 2017/0083916 A1 | 3/2017 | Fadli | |
| 2017/0083937 A1 | 3/2017 | Fadli | |
| 2017/0094058 A1 | 3/2017 | Piaggio | |
| 2017/0169331 A1 | 6/2017 | Garner | |
| 2017/0180554 A1 | 6/2017 | McCormack | |
| 2017/0278117 A1 | 9/2017 | Wallace | |
| 2017/0293919 A1 | 10/2017 | Li | |
| 2018/0047043 A1 | 2/2018 | Bharadwaj | |
| 2018/0053199 A1 | 2/2018 | Mathis | |
| 2018/0144350 A1 | 5/2018 | Mazak | |
| 2018/0300748 A1 | 10/2018 | Flaks | |
| 2018/0308123 A1 | 10/2018 | Zhong | |
| 2019/0266622 A1 | 8/2019 | Turnbull | |
| 2019/0279236 A1 | 9/2019 | Fadli | |

OTHER PUBLICATIONS

Hsieh et al., "A Data Driven Ensemble Classifier for Credit Scoring Analysis," in 27 Expert Systems with Applications 534-545 (2010). (Year: 2010).*

Singh, "Learning Bayesian Networks from Incomplete Data," in AAAI/IAAI 534-539 (1997). (Year: 1997).*

Darwiche, "Bayesian Networks," in 53.12 Comms. ACM 80-90 (2010). (Year: 2010).*

Aliferis et al., "Local Causal and Markov Blanket Induction for Causal Discovery and Feature Selection for Classification Part I: Algorithms and Empirical Evaluation," in 11 J. Machine Learning Res. 171-234 (2010). (Year: 2010).*

Bai, "Predicting Consumer Support Systems from Online Text," in 50 Decision Support Sys. 732-42 (2011). (Year: 2011).*

Jeziorski, P. et al., "Brand effects in search advertising.", (Sep. 11, 2014), URL: http://www.isid.ac.in/~epu/acegd2014/papers/SridharMoorthy.pdf, (Nov. 14, 2016), XP055374538. 31 pages.

International Searching Authority, International Search Report and Written Opinion in corresponding Application No. PCT/US2016/052536, dated Dec. 8, 2016, 7 pages.

Cheng, J., Marketo Data Tells Us: What Is The Top Conversion Rate by Channel?, <URL:http://blog.marketo.com/2015/08/marketo-data-tells-us-what-is-the-top-conversion-rate-by-channel.html>, dated Aug. 3, 2015, 4 pages.

Jeziorski, P. and Moorthy, S., Brand Effects in Search Advertising, <URL: http://www.isid.ac.in/-epu/acegd2014/papers/SridharMoorthy.pdf>, dated Sep. 11, 2014, 31 pages.

Jeziorski, P. and Segal, I., What Makes Them Click: Empirical Analysis of Consumer Demand for Search Advertising; <URL: http://faculty.haas.berkeley.edu/przemek/ads_paper.pdf>, dated Jul. 11, 2014, 39 pages.

International Searching Authority, International Search Report and Written Opinion in corresponding Application No. PCT/US2016/052509, dated Jan. 17, 2017, 11 pages.

Office Action dated Jul. 12, 2018 for U.S. Appl. No. 15/269,786 (pp. 1-12).

Introduction, the Perceptron, Haim Spolinsky, Massachusetts Institute of Technology, Oct. 4, 2013.

Office Action dated Nov. 29, 2018 for U.S. Appl. No. 15/269,786 (pp. 1-16).

An Overview of Computational Challenges in Online Advertising, Chatwin, Richard E., 2013 American Control Conference (ACC), Washington, DC, USA, Jun. 17-19, 2013 (18 pages).

Office Action dated Jul. 25, 2019 for U.S. Appl. No. 16/424,179 (pp. 1-22).

(56) References Cited

OTHER PUBLICATIONS

Office Action dated Jul. 25, 2019 for U.S. Appl. No. 16/457,285 (pp. 1-22).
Which Clicks Lead to Conversions, Modeling User-journeys Across Multiple Types of Online Advertising, Nottorf Florian, Ice-B 2013—10th International Conference on E-Business (12 pages).
Office Action dated Nov. 7, 2019 for U.S. Appl. No. 16/424,179 (pp. 1-10).
Office Action dated Nov. 7, 2019 for U.S. Appl. No. 16/457,285 (pp. 1-10).
Notice of Allowance dated Nov. 18, 2019 for U.S. Appl. No. 16/457,285 (pp. 1-7).
European Patent Office Communication pursuant to Article 94(3) EPC for Application No. EP16847551.5, dated Mar. 23, 2020, 9 pages.
European Patent Office Communication pursuant to Article 94(3) EPC for Application No. EP16847562.2, dated Mar. 23, 2020, 8 pages.
Jeziorski, P. et al., "What Makes Them Click: Empirical Analysis of Consumer Demand for Search Advertising"; <URL: http://faculty.haas.berkeley.edu/przemek/ads_paper.pdf>, dated Jul. 11, 2014, 39 pages.

* cited by examiner

UNIVERSAL IDENTIFICATION

CROSS-REFERENCE TO RELATED APPLICATIONS

This application claims the benefit of U.S. Provisional Application Nos. 62/220,727, filed Sep. 18, 2015 and 62/288,763, filed Jan. 29, 2016. This application is also related to and filed concurrently with U.S. application Ser. No. 15/269,786, filed Sep. 19, 2016 entitled Micro-Moment Analysis. The disclosures of the three applications referenced above are incorporated by reference herein in their entirety.

FIELD OF TECHNOLOGY

The present disclosure relates to the analysis of data using machine learning and other artificial intelligence algorithms and delivering those data to end users who are identified by the algorithms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

We are in the age of customer empowerment, where customers expect brands to be connected and relevant and to meet their needs at every interaction. To do so, leading marketers are taking a customer-obsessed approach to transforming their business by investing in the data, talents, tools and strategies needed to respond to the needs of the connected customer.

Today, many brands struggle to keep pace with the volume, velocity and variety of data in order to meet customer expectations. Most of the world's data has been created during the past two years. This growth and availability of data has led to an expectation of data usage to enable relevant, personalized experiences. It is not enough to collect and structure data, data must be acted upon. Consumers expect timely, relevant and seamless brand experiences. Therefore, brands must anticipate and predict their customers' needs, habits, trends and preferences to engage their customers in 1:1 conversation at the right moment of decision making.

As the connected economy marches forward at an accelerating pace, data are proving to be marketing's most valuable currency. Oceans of data generated from the Internet of Things (IoT) will magnify both the problem and the opportunity. But additional data lack value if it can't be reduced to useful insight that informs a unique, differentiated brand experience.

A phenomenon described as "data paralysis" keeps much of the data unused. While the opportunities are vast, as the volume, variety and velocity of data generated from a connected economy explode, digital marketing becomes increasingly difficult. By some measures, the amount of stored information grows four times faster than the world economy, while the processing power of computers grows nine times faster. It's little wonder marketers struggle with information overload that ironically reduces them to data paralysis where the benefits from data are never fully realized. In part, this scenario stems from a lack of the right mix of algorithms and technology for translating big data to actionable intelligence.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A Machine Intelligence Platform provides a way forward from data paralysis. The Machine Intelligence Platform may shift from data-driven marketing to intelligent marketing, where everyday decisions are informed by potentially billions of data points, rather than guesses and assumptions. Working with huge sources of structured, semi-structured and unstructured data, the platform may ingest, analyze and compare the data. Machine-learning algorithms can provide statistical evidence that something might be wrong or right based on how many past occurrences of similar patterns exist.

A "micro-moments" strategy to data analysis may provide further insight. As customers consume content, interact with each other and engage in multiple, simultaneous conversations, marketers have the challenge of determining the optimal moment to engage. During these optimal opportunities, known as micro-moments, the buyer may decide to either continue or abandon a relationship with the brand. Such micro-moments are real-time, intent-driven events that are a critical opportunity for brands to shape customer decisions and preferences.

The Machine Intelligence Platform may map the entire customer journey across devices and channels to predict how the consumer wants to interact with the brand and personalize each moment for the consumer. As the volume of data grows, intelligence extracted using a Micro-Moments Value Algorithm can ingest and activate data from multiple sources to provide insights that allow us to tap into micro-moments in the consumer's journey.

Real-time cognitive commerce may enable marketers to customize the shopping experience by supporting individually tuned merchandising, product recommendations, personalized search and guided navigation. Machine learning capabilities may support delivery of targeted and dynamic pricing and promotion. Algorithms may learn shopping behavior in real time to update the relevance of the customer experience as it occurs.

Machine learning may unlock the power of data and deliver highly customized experiences. In some embodiments, the Machine Intelligence Platform may determine the best available assets, the right creative data, message, offer, and call-to-action at the right moment using real-time customer insights and customer-level attribution. Data-driven audience segments may be dynamically created and activated across the marketer's Commerce, Media and Customer Engagement channels.

Within the Machine Intelligence Platform, a High-Frequency Intelligence Hub may process millions of signals and personalized streams of data to customize and activate targeted communication across channels, letting marketers engage with customers when they are shown to be most receptive to a message. This enables marketers and brands to use Intelligence-as-a-Service to inform Media, Commerce, CRM and Customer Experience simultaneously while providing insight and intelligence. In some embodiments, the High-Frequency Intelligence Hub may perform real-time analytics for Internet of Things ("IoT") solutions, stream millions of events per second, correlate across multiple streams of data, and process data streams at a high velocity with predictable results and no data loss.

Further, a universal identification graph algorithm may help marketers connect identities across devices and channels to one customer. The universal identification may allow marketers to seamlessly and securely engage customers with relevant brand experience as they move between devices and across all digital touch-points. For example, in some embodiments, the universal identification graph algorithm may integrate with a variety of digital management platforms ("DMPs"), enable mapping of a customer's journey across multiple, different identifications, allow deep personalization based on behaviors, habits, and preferences across the entire customer journey, help create a more comprehensive customer profile to enable marketers to target the customer with relevant content at the right time and through the right channels, and also provide the customer with the ability to quickly opt out.

A micro-moment value algorithm may enable the High-Frequency Intelligence Hub to use the Universal Identification Graph Algorithm to deliver the right message to the right person at the right time. Micro-moments are "touch points" within a customer's journey to determine how the journey ends. The Micro-Moments Value Algorithm may predict the key moments along the customer journey where customers are demonstrating their intent very clearly to provide the most compelling opportunity along the journey to engage with the customer. For example, in some embodiments, the micro-moments value algorithm may predict the right time to engage a customer with intent-driven micro moments, engage the customer with an immediate relevant ad and/or content at the right time, connect the "dots" across screens and channels, and map all the micro-moments of a customer's journey.

A computer implemented system may create and match a universal identification for a single user across multiple computer network devices and channels. The system may include a digital marketing platform server including one or more processors, a memory coupled to the one or more processors, and various modules for creating and analyzing a Bayesian network. A clustering module may include processor-executable instructions stored in the memory and operable on the processor to perform one or more clustering methods on data corresponding to a plurality of customers. The data may identify devices and channels for the customers. A regression module may include processor-executable instructions stored in the memory and operable on the processor to perform a regression analysis of the data corresponding to the plurality of customers. A multiclass classification module may include processor-executable instructions stored in the memory and operable on the processor to create multiclass classifiers for one or more of the devices and channels. An anomaly detection module may include processor-executable instructions stored in the memory and operable on the processor to receive training data corresponding to a class of datum within the data corresponding to the plurality of customers and to iterate over all possible combinations the devices and channels to determine a plurality of universal ID. A binary classification module may include processor-executable instructions stored in the memory and operable on the processor to create binary classifiers for the data corresponding to the plurality of customers. The binary classifiers may identify one universal ID that matches a set of the devices and channels data for the customers.

In further embodiments, a computer-implemented method may create a universal ID from data corresponding to a plurality of customers based on instructions stored in a memory of a computing device and operable on a processor of the computing device. In some embodiments, the method may create a Bayesian network based on the data corresponding to a plurality of customers. The Bayesian network may depict probabilistic relationships among the data corresponding to the plurality of customers. The method may also perform conditional and maximum queries on the Bayesian network, the queries including posterior marginals, a probability of evidence, a most probable explanation, and a maximum a posteriori hypothesis. The method may also discover cross device and cross channel variables within the data corresponding to the plurality of customers based on the Bayesian network as well as find matching behaviors and datum points within the data corresponding to the plurality of customers based on the Bayesian network.

BRIEF DESCRIPTION OF THE DRAWINGS

FIG. 10 illustrates an exemplary computing device used within the system for Universal ID matching across multiple computer network devices and channels and to implement the various algorithms, process flows, or methods described herein.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
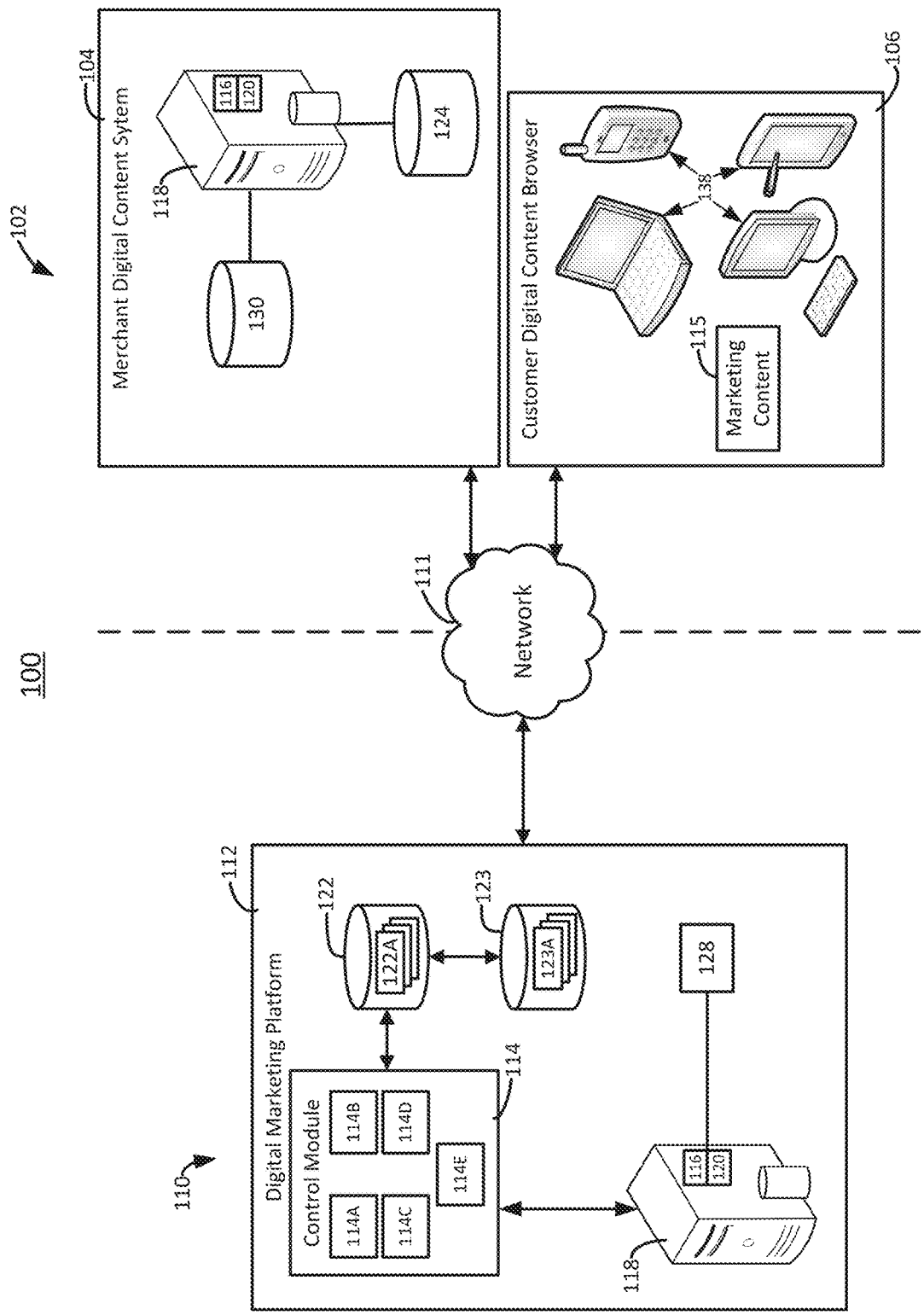
FIG. 1 illustrates a system for creating and matching a Universal ID across multiple computer network devices and channels.

FIG. 1 generally illustrates one embodiment of a system 100 for creating and matching a Universal ID across multiple computer network devices and channels as described herein. The system 100 may include front end components 102 (e.g., a merchant digital content system 104, a customer digital content browser system 106, etc.) and backend components 110 (e.g., a digital marketing platform 112). The front end components 102 and backend components 110 may be in communication with each other via a communication link 111 (e.g., computer network, internet connection, etc.). The system 100 may include various software or computer-executable instructions and specialized hardware components or modules that employ the software and instructions to provide a customer using the customer digital content browser 106 with targeted marketing content 115. The various modules may be implemented as computer-readable storage memories containing computer-readable instructions (i.e., software) for execution by a processor of the computer system 100 within a specialized or unique computing device. The modules may perform the various tasks associated with creating and using a Universal ID and other functions as described herein. The computer system 100 may also include both hardware and software applications, as well as various data communications channels for communicating data between the various specialized or unique front end 102 and back end 110 hardware and software components.

The digital marketing platform 112 may include one or more instruction modules including a control module 114 that, generally, may include instructions to cause a processor 116 of a digital marketing platform server 118 to functionally communicate with a plurality of other computer-executable steps or modules 114A-E. These modules 114A-E may include instructions that, upon loading into the server memory 120 and execution by one or more computer processors 116, create a Universal ID as described herein. A first data repository 122 may include First Party Data 122A that includes various pieces of data to describe a customer user of the customer digital content browser 106 executing on a customer computing device 138. In some embodiments, the First Party Data 122A includes data 124 from one or more merchants that are linked to the digital marketing platform 112. The First Party Data 122A may include a customer profile, preferences, habits and behaviors, channels, etc. For example, a customer profile may include a customer name and account information for a particular merchant at the merchant digital content system 104. Preferences may include a customer's purchase history with a merchant, a wish list, Cookie datum, bid requests or responses, social likes, etc., between a customer and a merchant. Habits and behaviors may include a customer and/or merchant location, a wireless SSID, or a data analysis performed by the merchant on customer data. Channels data may include customer/merchant commerce data, customer relationship management ("CRM") data, and social media data. A second data repository 123 may include Third Party Data 123A. For example, other services may collect and share or sell data that is tied to a particular customer. In some embodiments, the Third Party Data 123A may include Application Marketplace Data (e.g., iOS or Android data including App Figures from docs.appfigures.com, www.appannie.com, and Distmo. APPNEXUS® may also be a source of the Third Party Data as well as the LOTAME® Data Exchange, and FACEBOOK®.

Figure 2:
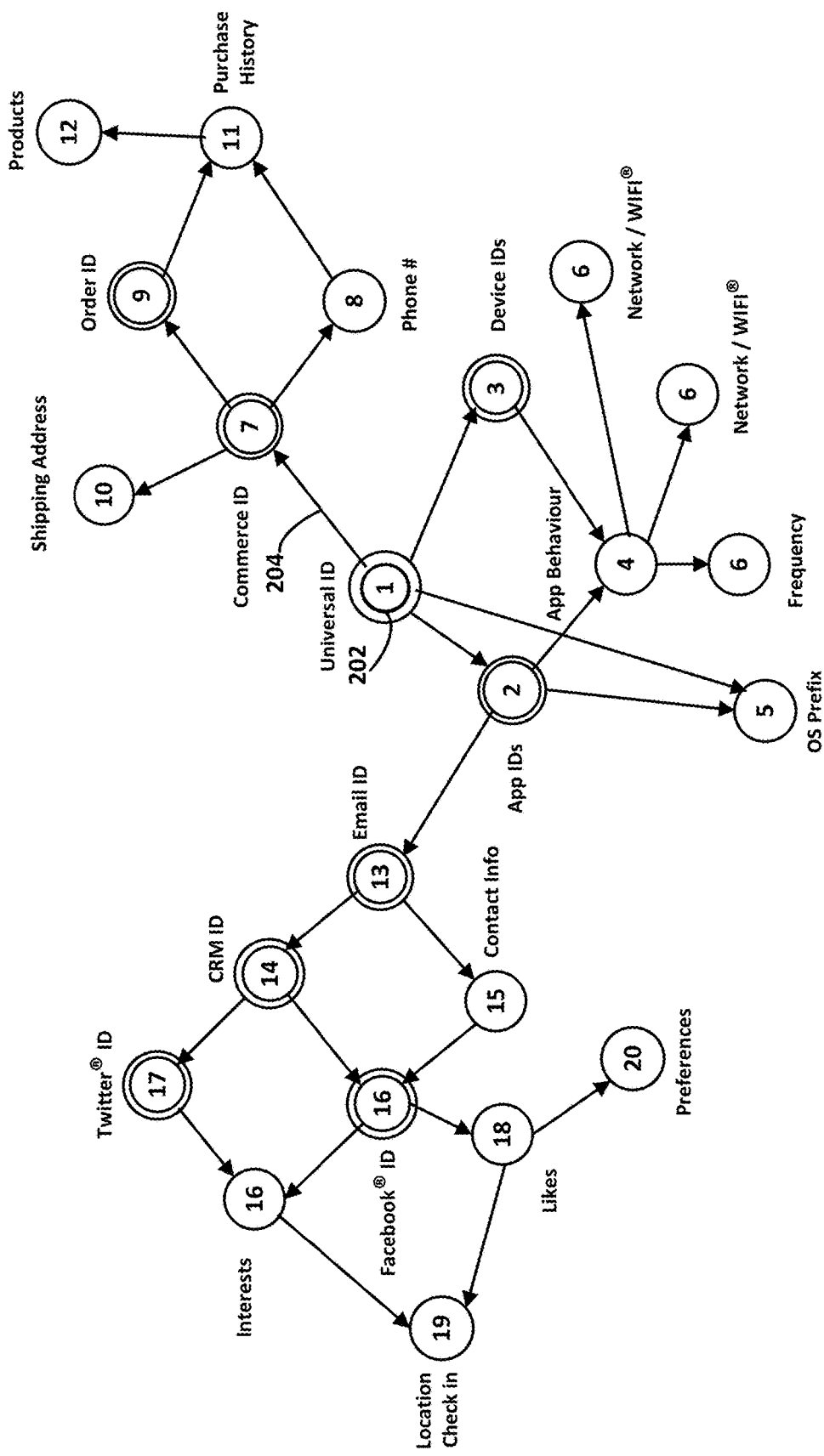
FIG. 2 illustrates an example Universal ID graph model.

The modules 114A-E may include a plurality of instructions to implement a graph algorithm to create and use the universal ID 128. The universal ID 128 and graph algorithm helps marketers connect identities across devices and channels to a single customer. With brief reference to FIG. 2, the control module 114 may employ a graph model 200 (FIG. 2) to seamlessly and securely engage customers with relevant brand experience as they move between devices and across all digital touch-points. The model 200 and algorithm may allow integration with data management platforms via segmentation and enable customer journey mapping across various identifications used by customers on different platforms. The universal ID and graph algorithm may also allow deep personalization based on behaviors, habits, and preferences and other sources of data 122A, 123A across the entire customer journey. Also, the model 200 may help build a more comprehensive customer profile enabling marketers to target the customer with relevant digital content 130 at the right time and through the right channels while also permitting simple and complete opt-out by the customer. In use, the universal ID 128 and algorithm may be applied to customer journey mapping, social sentiments analysis, personalization, a complete profile for each customer, ad campaigns and targeted marketing, attribution analysis, a recommendation engine, and gamification for loyalty programs.

Importantly, attributes are attached to both vertices or nodes (e.g., 202) and arcs or edges (e.g., 204) of the model 200. The model 200 may represent a Bayesian Network ("BN") consisting of both a directed acyclic graph ("DAG") and a conditional probability distribution ("CPD"). Bayesian probability represents the degree of belief in an event while classical probability or "frequentist" approach deals with the true or physical probability of an event. Bayesian networks are particularly suited to incomplete data sets such as those described herein as the First Party Data 122A and the Third Party Data 123A. The nodes 202 may include random variables that are typically binary or discrete, but may also be continuous. These networks may also allow learning about causal networks as well as the combination of both domain knowledge and data while avoiding the "overfitting" of data. The edges 204 may indicate probabilistic dependencies between nodes where a lack of a link may signify conditional independence. The CPD may indicate conditional probabilities at one or more nodes of the model 200 and may be stored as a conditional probability table ("CPT"). Additionally, queries on the model 200 may combine both edge traversals with attribute accesses and specific structures to improve traversals. For example, the model 200 may index both the edges and the neighbors of each node. In some embodiments, object identifiers ("OIDs") may be employed instead of complex objects to reduce memory requirements.

The modules 114A-E may include instructions for execution on the processor 116 to mine the First Party Data 122A and the Third Party Data 123A for use in creating the model 200 and the Universal ID 128. For example, the modules 114A-E may include instructions to tag emails, social media IDs, device IDs, and cookie IDs, as well as perform geolocation clustering using the data 122A and 123A. Likewise, the modules 114A-E may include instructions to identify meaningful structural relations between the First Party Data 122A, the Third Party Data 123, and unstructured data. In some embodiments, the modules include an anomaly detection module 114A, a clustering module 1146, a multiclass classification module 114C, a binary classification module 114D, and a regression module 114E.

Figure 3:
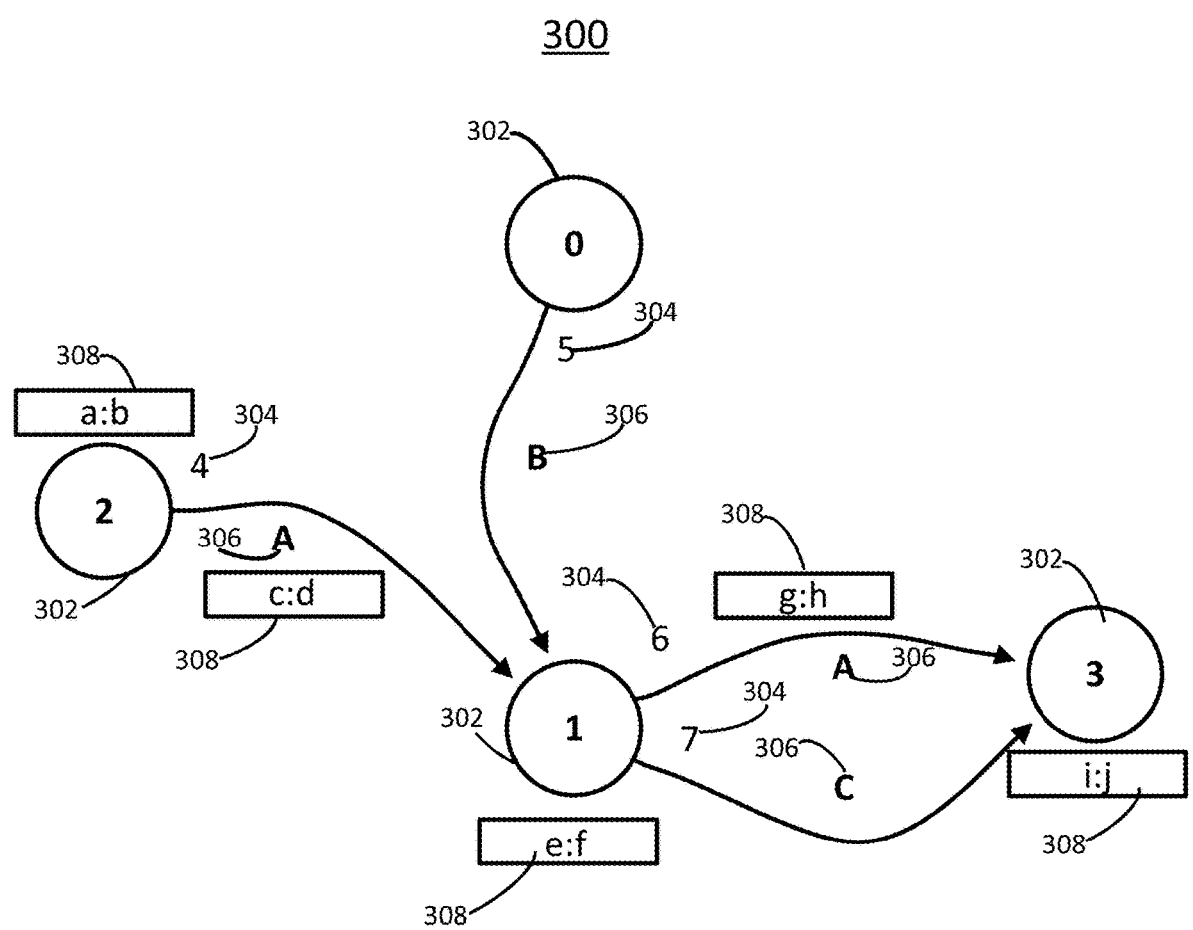
FIG. 3 illustrates an example directed acyclic graph ("DAG")

With reference to FIG. 3, the model 200 may include various elements 300 including vertices 302, edge IDs 304, edge labels 306, and element properties 308.

Figure 4:
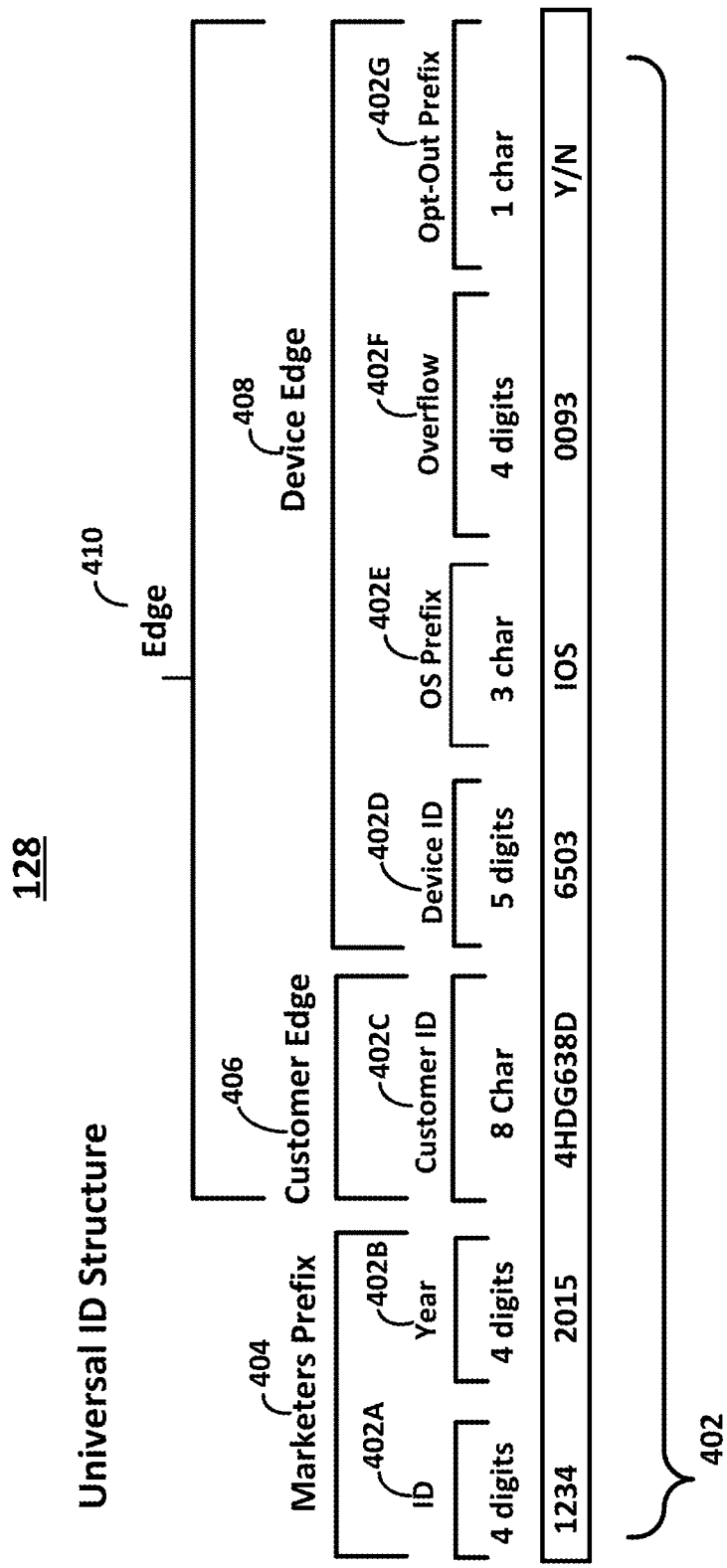
FIG. 4 illustrates an example data structure including elements of a Universal ID.

With reference to FIG. 4, the Universal ID 128 may be stored in any of a number of data structures (e.g., a string, linked list, array, file, record, table, tree, etc.) and include a variety of information as determined from the model 200. In some embodiments, the Universal ID 128 may include a sequence of characters (i.e., letters and/or numbers) including a plurality of character collections 402 that each represent information determined from the model 200. For example, the collections 402 may include a user ID 402A, a year 402B, a customer ID 402C, a device ID 402D, an operating system prefix 402E, and overflow 402F, an opt-out prefix 402G, etc. Groups of the collections 402 may indicate other information either determined from or represented by the model 200. For example, a marketers prefix 404 may be indicated by a grouping of both the ID 402A and the year 402B. A customer edge 406 may be indicated by the customer ID 402C, and a device edge 408 may be indicated by a grouping of the device ID 402D, the OS prefix 402E, the overflow 402F, and the opt-out prefix 402G. An edge 410, for example, an edge 204 indicated by an arrow within the model 200, may be indicated by a grouping of the customer edge 406 and the device edge 408. Of course, other information may be indicated within the Universal ID 128 such as contact information, network information, products, purchase history, or any other information that may be determined from or using the model 200.

Figure 5:
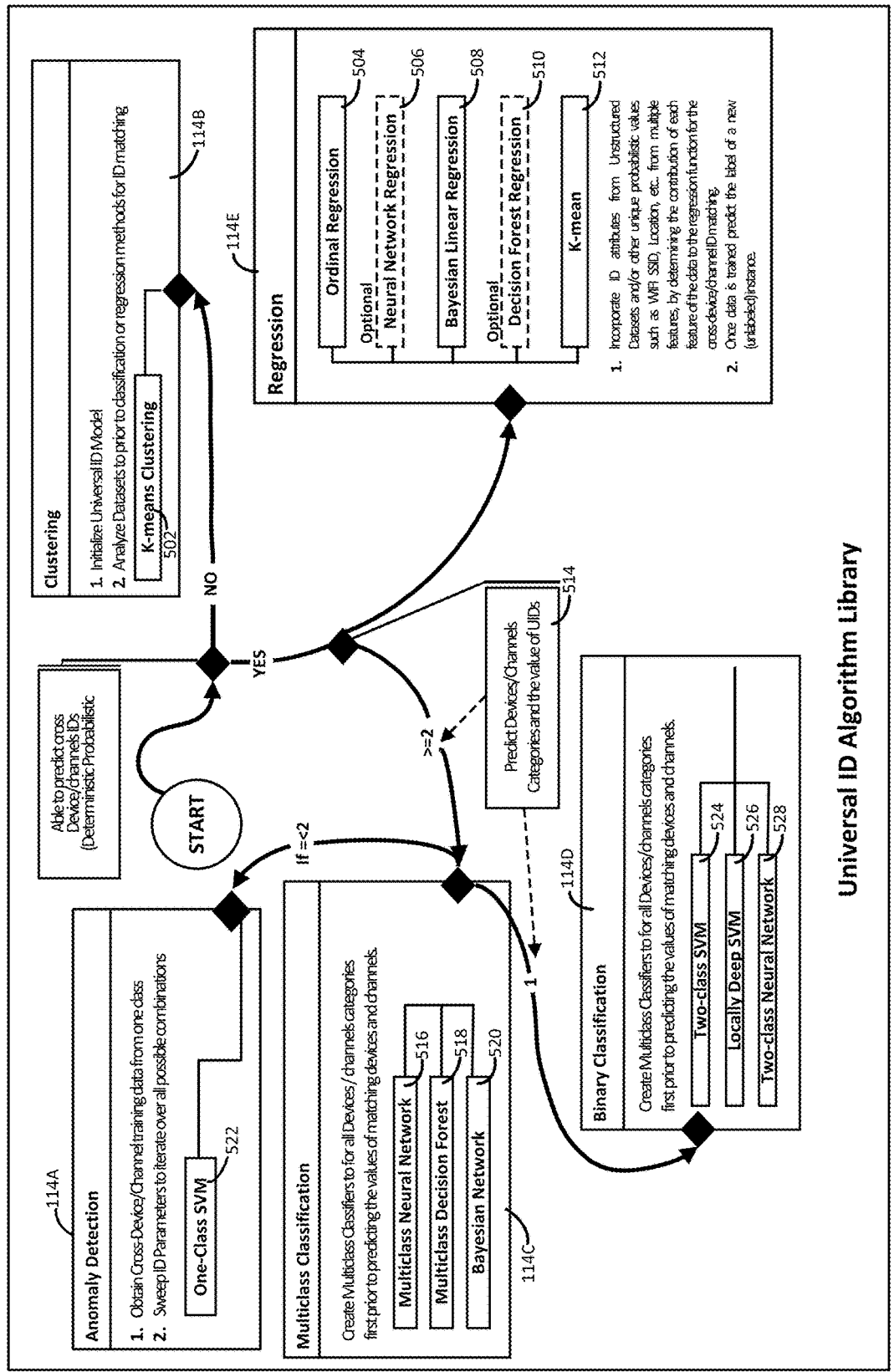
FIG. 5 illustrates an exemplary process flow to create a Universal ID.

With reference to FIG. 5, the control module 114 executes instructions stored in a memory 120 and executed on a processor 116 to create the model 200 and Universal ID 128. In some embodiment, the control module 114 may include a plurality of sub-modules stored in the memory 120 including an anomaly detection module 114A, a clustering module 114B, a multiclass classification module 114C, a binary classification module 114D, and a regression module 114E. The sub-modules 114A-E may include instructions stored in a memory 120 and executed on a processor 116 to create the model 200 and Universal ID 128.

The clustering module 114B may include instructions to initialize the model 200 and analyze data. In some embodiments, the module 114B may include instructions to analyze one or more of the first data repository 122 and the second data repository 123. For example, the clustering module 114B may include instructions to analyze one or more of the First Party Data 122A and the Third Party Data 123A. The clustering module 114B may perform various clustering methods on the data to determine whether the a Universal ID 128 is able to be predicted from the data. For example, the clustering module 114B may perform a K-means clustering process 502 on one or more of the First Party Data 122A and the Third Party Data 123A.

The regression module 114E may then use one or more of the First Party Data 122A and the Third Party Data 123A to perform a regression analysis of the data. In some embodiments, the regression analysis may include one or more of an ordinal regression 504, a neural network regression 506, a Bayesian linear regression 508, a decision forest regression 510, and a K-means regression 512. In some embodiments, the regression module 114E may also include instructions to incorporate ID attributes from unstructured data sets and/or other unique probabilistic values from multiple data sources by determining the contribution of each data source to the regression function for matching pieces of unique data to a single universal ID 128. Unstructured dataset and probabilistic values may include a wireless SSID, customer and/or merchant location, or other data. The module 114E may also predict a label for a data instance once the data is trained by one or more of the regression module 114E and the clustering module 114B.

The control module 114 may include an instruction 514 to predict one or more of the device and channel categories and a value of the universal ID 128 based on the analysis of one or more of the clustering module 114B and the regression module 114E.

A multiclass classification module 114C may include instructions to create multiclass classifiers for one or more of the devices and channels described by the First Party Data 122A and the Third Party Data 123A prior to the control module 114 executing an instruction 514 to predict the values of matching devices and/or channels. In some embodiments, the multiclass classification module 114C includes one or more of a multiclass neural network module 516 to create and/or traverse a multiclass neural network based on the data 122A, 123A, a multiclass decision forest module 518 to create and/or traverse a multiclass decision forest based on the data 122A, 123A, and a Bayesian network module 520 to create and/or traverse a Bayesian network based on the data 122A, 123A.

An anomaly detection module 114A may include instructions to obtain cross-device and/or channel training data from one particular class of the data 122A, 123A (e.g., wireless SSID, customer ID, etc.) and sweep ID parameters to iterate over all possible combinations to determine a universal ID for the data 122A, 123A. In some embodiments, the anomaly detection module 114A includes a one class support vector machine ("SVM") 522.

Where the instruction 514 determines greater than or equal to two universal IDs 128 that could match a particular device or channel based on an analysis of one or more of the First Party Data 122A and the Third Party Data 123A, the control module 114 may execute one or more of the modules 516, 518, and 520 of the multiclass classification module 114C to refine the result. If one or more of the modules 516, 518, and 520 of the multiclass classification module 114C determines that less than or equal to two (but not exactly one) universal ID 128 could still match a particular device or channel based on an analysis of one or more of the data 122A, 123A, then the control module 114 may execute the one-class SVM module 522 of the anomaly detection module 114A to refine the result.

A binary classification module 114D may include instructions to create binary classifiers for the data 122A, 123B where the instruction 514 determines exactly one universal ID 128 that matches a set of data within the data 122A, 123B. In some embodiments, the binary classification module 114D may include one or more of a two-class SVM module 524, a locally deep SVM module 526, and a two-class neural network module 528.

Figure 6A:
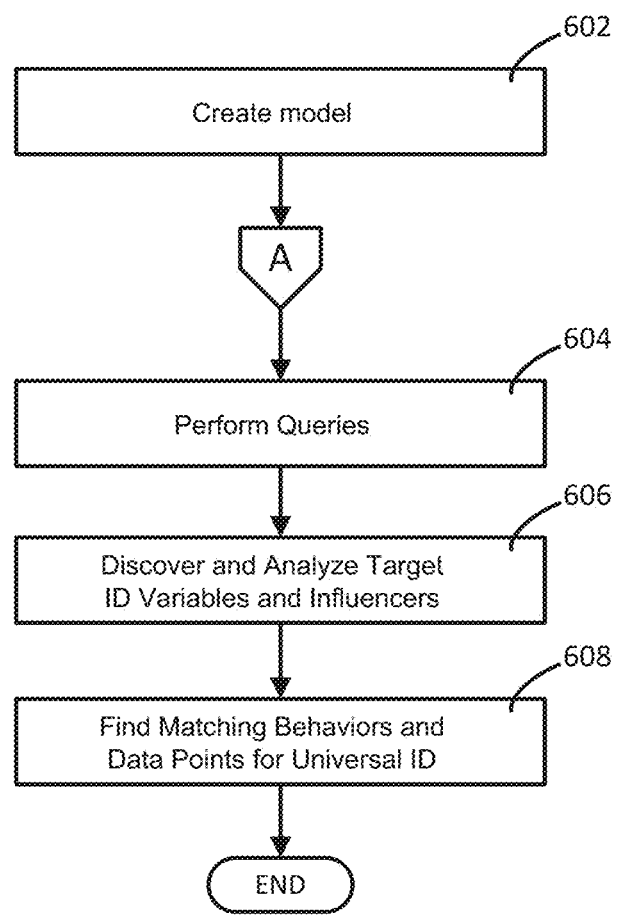
FIGS. 6A and 6B illustrate further exemplary process flows to create a Universal ID.

With reference to FIG. 6A, a computer-implemented method 600 may create a universal ID 128 using one or more of the First Party Data 122A and the Third Party Data 123A. Each step of the method 600 may be performed on a server (e.g., the server 118, etc.) or other computing device including instructions that, when executed by a processor, perform the action or function block ("block") described herein. At block 602, the method 600 may create a model 200 or graph for cross-device/channel matching. The universal ID 128 may help marketers algorithmically map the journey of their customers to connect unique identifiers from one or more of the data 122A, 123A across digital channels and connected devices to one customer. In use, the universal ID 128 may allow marketers to seamlessly reach customers across screens and devices by extending the First Party Data 122A and the Third Party Data 123A. The universal ID 128 may also provide timely and relevant brand experiences across all touch-points using deep personalization and create a comprehensive customer persona. In some embodiments, the system 100 and method 600 may employ a combination of graph-based representations and reasoning algorithms known as deterministic and probabilistic graphic models to establish users' identities across devices and channels based on the structured and unstructured data of the First Party Data 122A and the Third Party Data 123A.

Deterministic graphical models rely on personally identifiable information to make device matches such as an email address when a person logs in into a mobile app and/or website. In some embodiments, the method may hash the First Party Data 122A using a secure hashing technique such as SHA-256.

Probabilistic graphical models may algorithmically analyze large unstructured datasets and anonymous data points such as device type, operating system, location data, time, and other types of Third Party Data 123A. This analysis may create graph-based representations and lookalike matches between connected devices and other ID or the customer online "persona" generally. The Bayesian networks and SVMs described herein and in relation to FIG. 5 are used by the system 100 and method 600 to express probabilistic information on the universal ID 128 via graphical models 200.

Generally, the Bayesian network may be a graphical model for depicting probabilistic relationships among a set of variables capable of displaying relationships clearly and intuitively. The Bayesian network ("BN") may handle uncertainty through established theories of probability. The BN may also encode the conditional independence relationships between variables in the structure of the model 200. The BN may also provide a compact representation of the joint probability distribution over the variable. In some embodiments, the problem domain may be modeled by a list of variables and knowledge about the domain may be represented by a joint probability. Directed links (e.g., the edges 204) within the BN may represent causal direct influences and each node 202 may have a conditional probability table quantifying the effects from the parent nodes. For example, in a graph having parent nodes A and B that both point to a target node T where T and spouse node C both point to a child node D, the graph's joint probability table may be tabulated using Equation 1:

$$P(A,B,C,D)=P(T|A,B)*P(D|T,C)*P(D|C)*P(A)*P(B)*P(C) \quad \text{EQUATION 1}$$

Equation 1 may be generalized for all graphs as Equation 2:

$$P_B(X_1, \ldots, X_n) = \prod_{i=1}^{N} P_B(X_1 \mid \pi_{X_1}) = \prod_{i=1}^{n} \theta_{X_i \mid \pi_{X_i}} \quad \text{EQUATION 2}$$

Figure 6B:
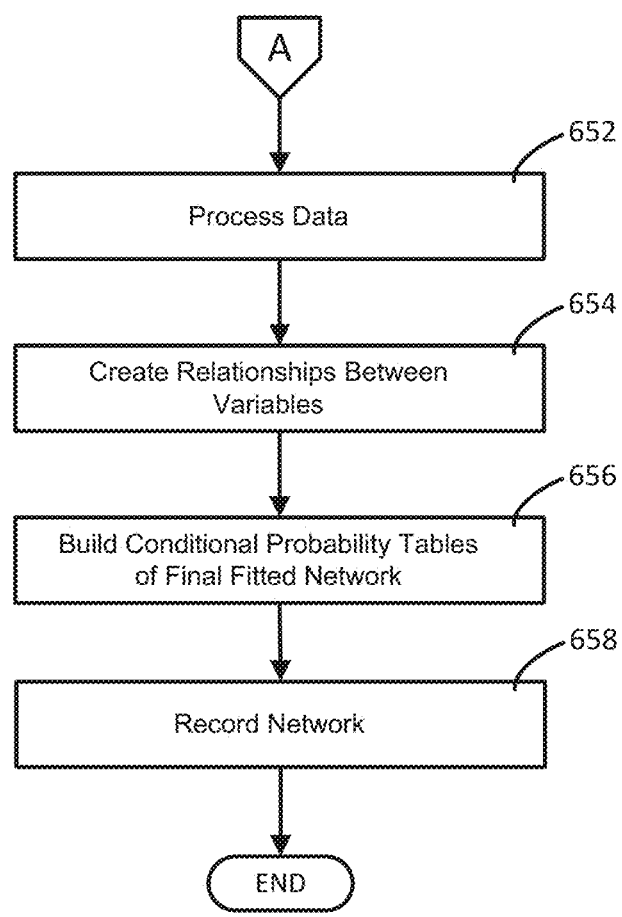

With reference to FIG. 6B, a method 650 may create a Bayesian network for a universal ID 128. Each step of the method 650 may be performed on a server or other computing device (e.g., the server 118, etc.) including instructions that, when executed by a processor, perform the action or function block ("block") described herein. At block 652 the method 650 may process the data to be analyzed by the BN. In some embodiments, the data include one or more of the First Party Data 122A and the Third Party Data 123A, but may include other structured and unstructured data sets that could provide a universal ID 128. Further, the data processed by block 652 may include categorical values and may also be "binned" or grouped where the data include a number of more or less continuous values into a smaller number of "bins." For example, if you have data about a group of people, you might want to arrange their ages into a smaller number of age intervals. Binning can also be used in several dimensions at once. Too, the data may be converted to factors.

At block 654, the method 650 may create relationships between the data 122A, 123A. In some embodiments, the block 654 may include the fitting of the BN using a scoring function φ (Phi) and, given data 122A, 123A and scoring function φ, find a network that maximizes the value of φ. Additionally, the block 654 may include instructions to try various permutations of adding and removing arcs, such that the final BN has a maximum posterior probability distribution on the possible networks conditioned on the data 122A, 123A.

At block 656, the method 650 may build conditional probability tables (CPTs) for the final, fitted BN. In some embodiments, while learning the BN, the method 650 may create the joint probability distribution for all variables in the data sets 122A and 123A. The block 656 may also convert the joint probability distribution to conditional probabilities for each dependent variable. In use, the CPTs may be used to solve various kinds of analysis problems arising from the data.

At block 658, the method 650 may record the model 200. In some embodiments, the model 200 and its associated CPTs may be analyzed by a machine learning or other analysis program to form hypotheses regarding the data 122A, 123A, and verify the computations that formed the BN.

Figure 7:
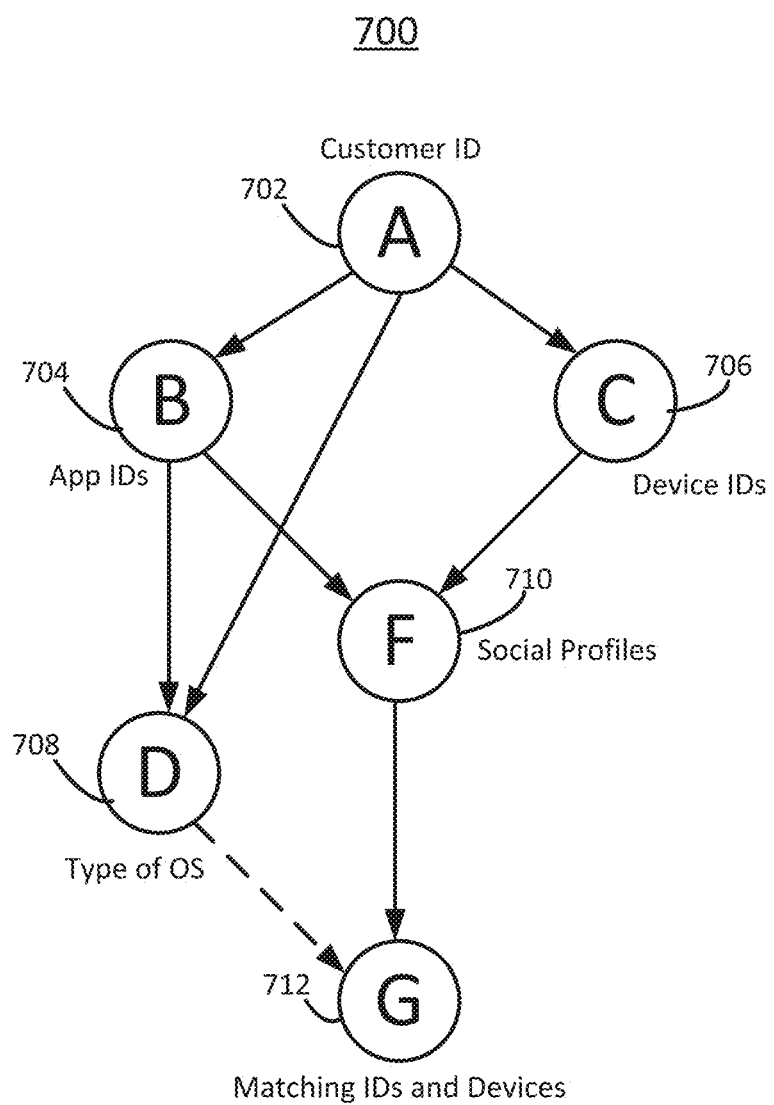
FIG. 7 illustrates a further example of a DAG.

With reference to FIG. 7 and Table 1, an example directed acyclic graph (DAG) 700 and conditional probability table may combine possible types from the First Party Data 122A as nodes and the associated conditional dependencies of one or more of the Third Party Data 123A and other unstructured data. In some embodiments, the ID types may include a customer ID 702, an application ID 704, a device ID 706, a type of operating system 708, a social media profile 710, and matching IDs and devices 712. Each node of the DAG 700 may include a conditional probability table for example, Table 1 showing the conditional probability for node 710 of directed graph 700:

TABLE 1

| B | C | F | P(F|B, C) |
|---|---|---|---|
| false | false | true | 0.1 |
| true | false | true | 0.9 |
| false | true | true | 0.8 |
| true | true | true | 0.95 |

Conditional Probability Table for Node 710 of Directed Graph 700

The BN represented by the combination of the DAG 700 and the CPT of Table 1 may be indicated by Equation 3:

$$P(A,B,C,D,F,G)=P(A)*P(B|A)*P(C|A)*P(D|B,A)*P(F|C,B)*P(G|F) \quad \text{EQUATION 3}$$

Returning to FIG. 6A, block 604 may then perform conditional and maximum probability queries on the BN resulting from method 650. Given evidence E=e where E is the evidence variable and e is its assignment, the primary queries over the BN may be to find the following four quantities:

1. Posterior marginals or "belief updating" as described by Equation 4:
   For every $X_i$ not in E, the belief is defined by:

$$bel(X_i) = P_\beta(X_i \mid e) \text{ where } P_\beta(X_i \mid e) = \sum_{X-X_i} \prod_j P(X_j \mid X_{pa_j}, e) \quad \text{EQUATION 4}$$

2. The probability of evidence as described by Equation 5:

$$P_\beta(E = e) = \sum_X \prod_j P(X_j \mid X_{pa_j}, e)$$ EQUATION 5

3. The most probable explanation (mpe) as described by Equation 6:

$$mpe = P_\beta(x^0) =$$ EQUATION 6 an assignment $[x^0 = (x_1^0, \ldots, x_n^0)]$ satisfying $x^0 =$ $$\mathrm{argmax}_x P_\beta = \mathrm{argmax}_x \prod_j P(X_j \mid X_{pa_j}, e)$$

4. The maximum a posteriori hypothesis (marginal mpe). Given a set of hypothesized variables $A = \{A_1, \ldots, A_K\}$, $A \subseteq X$, find an assignment $a^0 = (a_1^0, \ldots, a_k^0)$ such as:

$$a^0 = \mathrm{argmax}_A \sum_{X-A} P(X \mid e) = \mathrm{argmax}_A \sum_{X-A} \prod_j P(X_j \mid X_{pa_j}, e)$$ EQUATION 7

At block 606, the method 600 may discover and analyze target ID variables and influencers. In some embodiments, the method 600 may discover the cross device/channel ID variables and other influencing variables with the BN. For example, the block 606 may find the values of the variables that influence the target variable the most in order to maximize/minimize the desired target variable class. Using a Markov Blanket of the target variable, when considered together, the variables make the target variable independent of the rest of the network. For 1$^{st}$ level Markov Blanket variables, deterministic data from the First Party Data 122A such as a customer profile, social data, commerce data, and cookie IDs may be combined with Third Party Data 123A such as app marketplace data and other data such as FACEBOOK® and TWITTER® data. For 2$^{nd}$ level Markov Blanket variables, the Third Party Data 123A as well as some First Party Data 122A like bid/response data may be combined with probabilistic data such as behaviors and habits and/or web and search data.

Figure 8A:
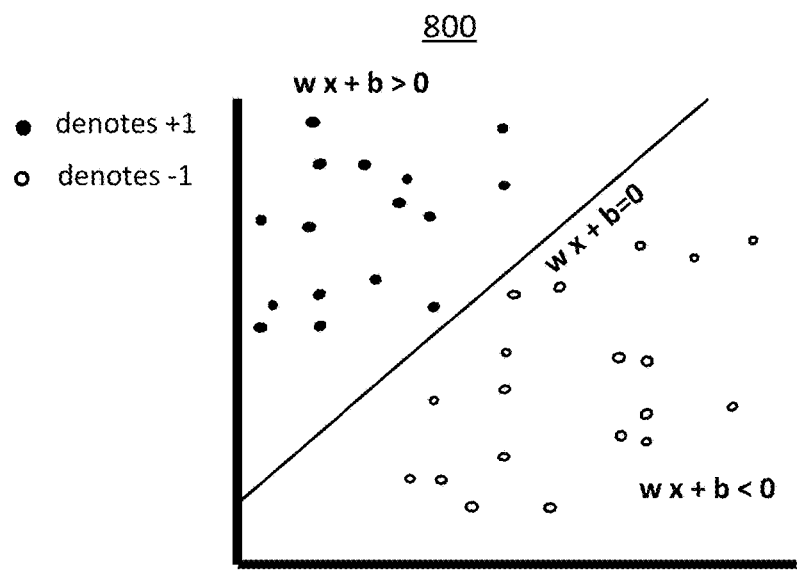
FIGS. 8A, 8B, 8C, and 8D illustrate exemplary graphs for pattern recognition.
Figure 8B:
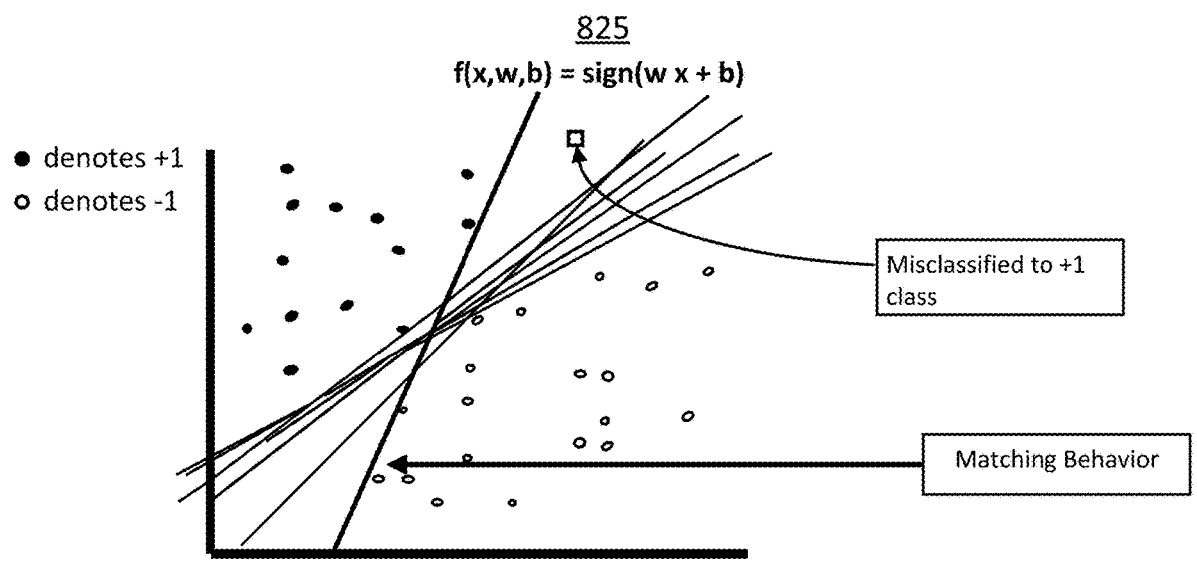
Figure 8C:
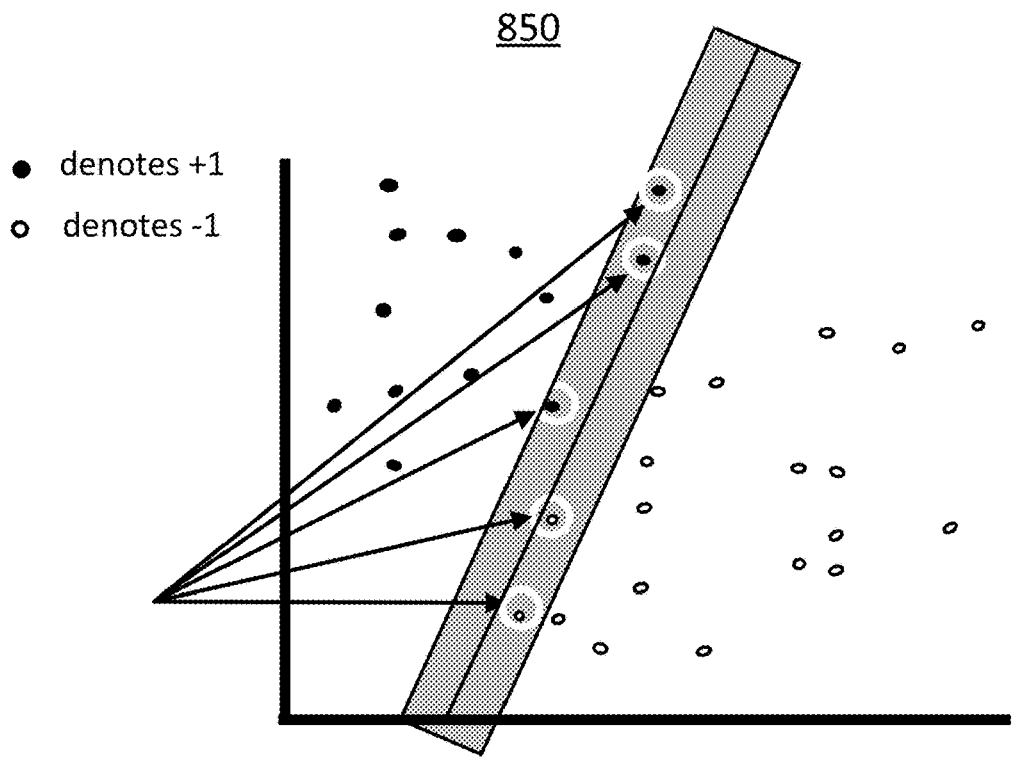
Figure 8D:
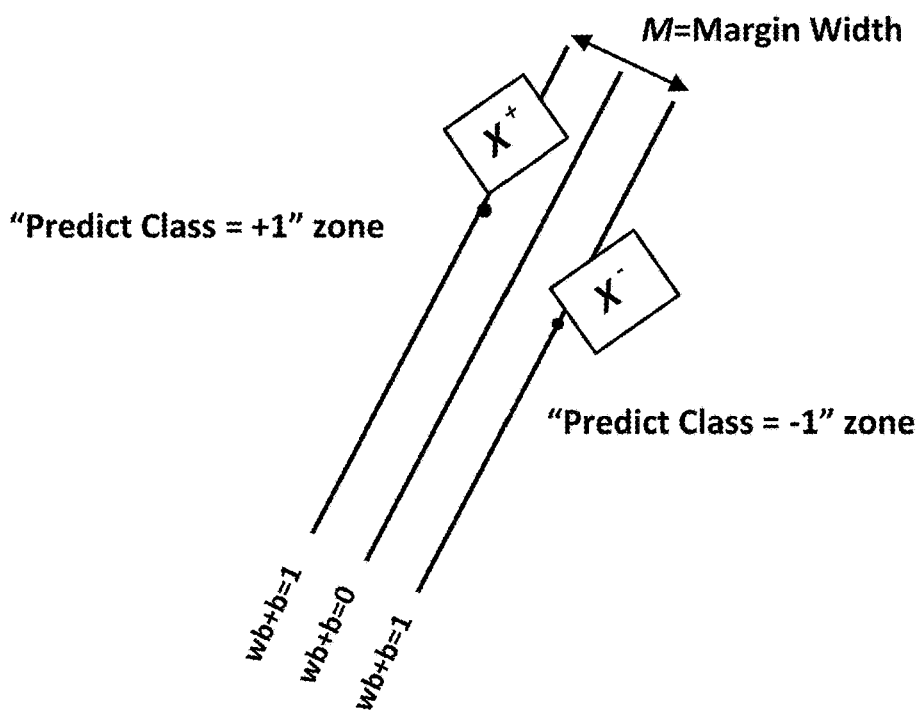

At block 608, the method 600 may find matching behaviors and data points for the universal ID. In some embodiments, the block 608 may include pattern recognition with support vector machines (SVMs). The SVMs may be supervised learning models with associated learning algorithms that analyze data and recognize patterns and may be used for classification and regression analysis. Block 608 may use the SVM to classify behaviors into linear classifiers to predict each data point. For example, the method 600 may classify deterministic customer data as illustrated in the graph 800 (FIG. 8A) at block 608. Block 608 may also classify unstructured Third Party Data 123A that best matches the customer behaviors and patterns or deterministic customer data. For example, the graph 825 (FIG. 8B) may use a time series for anomaly detection as in module 114A for the classification of modules 114C and 114D. Further, block 608 may optimize pattern recognition by maximizing the margin. For example, graph 850 (FIG. 8C) illustrates finding support vectors that represent the possible behavior data points that the margin pushes up against to evaluate as a possible match. As further illustrated in the graph 875 (FIG. 8D), the goal of identifying a universal ID is to correctly classify all training data and maximize the margin as described by Equation 8:

$$wx_1 + b \geq 1 \text{ if } y_i = +1 \text{ and } wx_1 + b \leq 1 \text{ if } y_i = -1 \text{ where}$$
$$y_i(wx_1 + b) \geq 1 \text{ for all } i$$ EQUATION 8

In some embodiments, the system 100 may include a module to determine a value for each customer for which a universal ID has been discovered and assigned. For example, an algorithm may determine whether a customer is going to be profitable or not and for how long. Also, an algorithm may predict the monetary value associated with a customer relationship. Equation 9 illustrates one example of a customer lifetime value ("CLV") algorithm:

$$CLV = \sum_{m=1}^{t} \left( \frac{\text{Future Contribution Margins}}{\text{Historical Lifetime Value} * p} \right) - \left( \frac{\text{Cost of Acquisition}}{CL^{(m)}} \right)$$ EQUATION 9

In Equation 9, m=the micro-moment index; p=total number of purchases in a period of time; t=number of time periods the CLV is being calculated; and CL=the Customer Loyalty Index. The CLV algorithm of Equation 9 may allow observation of various individual-level buying patterns from the past and find the various customer stories in the data set. It may also allow understanding of which patterns correspond with valuable customers and which patterns correspond with customers who are opting out. As new customers join a system implementing the CLV algorithm of Equation 9, the system (e.g., system 100) may match the new customer to patterns that are recognized by the CLV algorithm.

In some embodiments, the system 100 may also include a module to determine which impressions will best meet the advertising performance metrics. For example, an algorithm may optimize timing for real-time bidding ("RTB") on customer impressions within a website for a merchant. For example, advertising campaign budget constraints may be given as impression delivery goals $q_j$. An impression group i may be defined as a (placement, user) tuple, at which level both click-through-rate ("CTR") prediction $p_{ij}$ and inventory control may be performed. Given the above, the cost term $w_i$ will be zero since impressions are from the inventory. The timing for RTB may also be optimized.

In some embodiments, the system 100 may also include a module to evaluate each customer impression based on its predicted probability to achieve a goal of the advertising campaign. Costs per thousand ("CPM") may also be analyzed, where optimized daily or other periodic budget updates may be calculated and posted, as needed, to meet each campaign goal.

Figure 9:
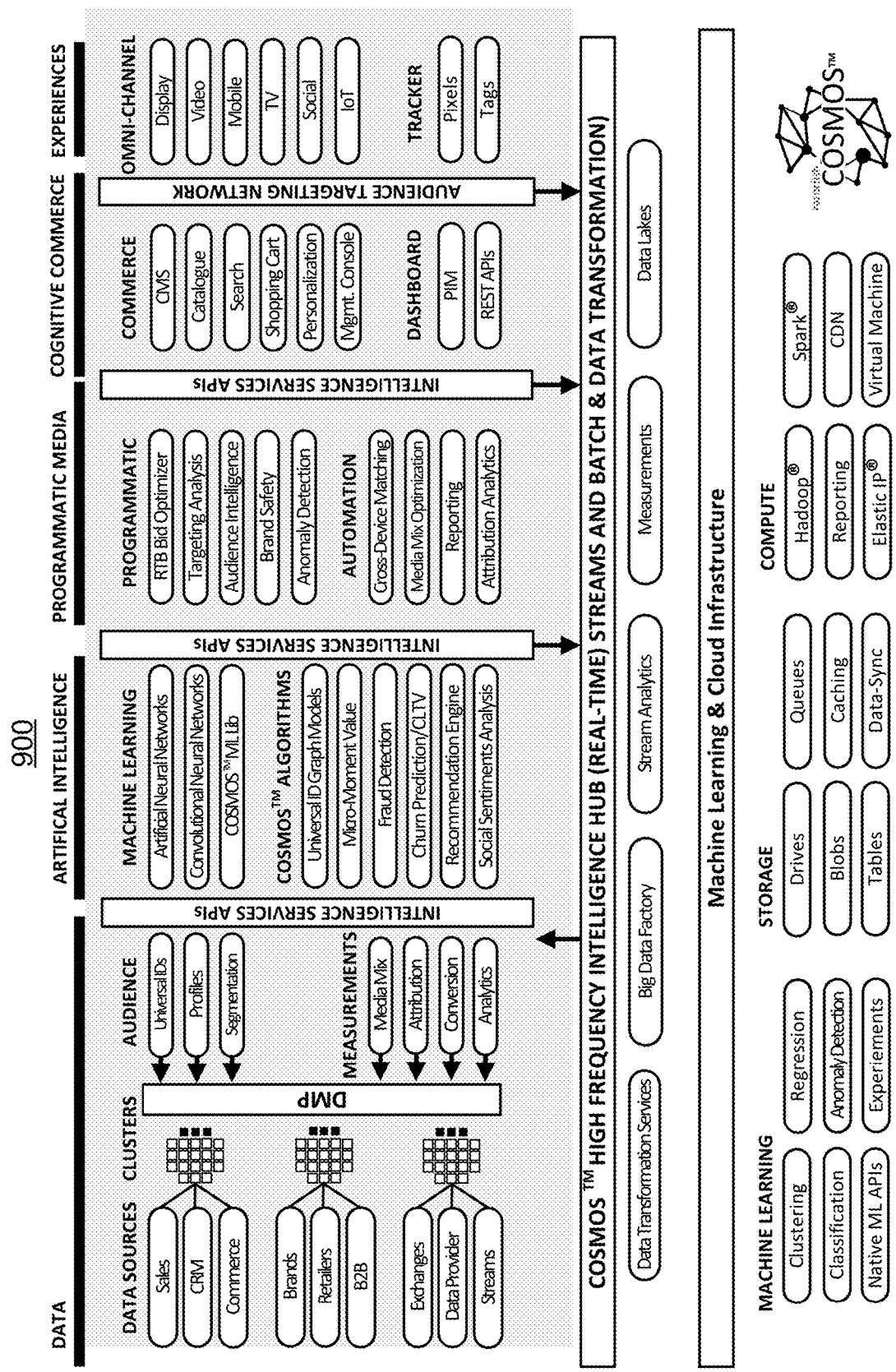
FIG. 9 illustrates an exemplary structure for the system for creating and matching a Universal ID across multiple computer network devices and channels as described herein.

FIG. 9 is a high-level block diagram of the various components of the system 100.

FIG. 10 is a high-level block diagram of an example computing environment 1000 for the systems and methods described herein for creating and matching a Universal ID 128 for a single user across multiple computer network devices and channels. The computing device 1001 may include a server (e.g., digital marketing platform server 118), a customer computing device (e.g., customer computing device 128, a cellular phone, a tablet computer, a wireless-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods may be used to implement and execute the example systems illustrated in the figures. Although the example system 1000 is described below as including a plurality of peripherals, interfaces, chips, memories, etc., one or more of those elements may be omitted from other example processor systems used to implement and execute the example systems for creating and matching a Universal ID 128 across multiple computer network devices and channels. Also, other components may be added.

As shown in FIG. 10, the computing device 1001 includes a processor 1002 that is coupled to an interconnection bus. The processor 1002 includes a register set or register space 1004, which is depicted in FIG. 10 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 10, the computing device 1001 may be a multi-processor device and, thus, may include one or more additional processors that are identical or similar to the processor 1002 and that are communicatively coupled to the interconnection bus.

The processor 1002 of FIG. 10 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, the computing device 1001 is used to implement a module 1016 (e.g., the various modules described in relation to FIG. 1 and other modules as herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001 and the system 100. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028, (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the backend components of the system 100, 900 and perform any operations related to the methods as described herein. The local network transceiver 1028 may include support for a wireless network, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 10 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a JAVA® applet executing within a JAVA® Virtual Machine (JVM) environment resident in the computing device 1001 or the remote computing device 1030. In some embodiments, the module 1016 may communicate with back end components 1038 such as the backend components 110 of FIG. 1 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 10 to simplify and clarify the description, it is understood that any number of client computers are supported and can be in communication within the system 1000.

Additionally, certain embodiments are described herein as including logic or a number of components, modules, or mechanisms. Modules may constitute either software modules (e.g., code or instructions embodied on a machinereadable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations or "blocks" as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "datum," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method to create a universal identification from data corresponding to a plurality of customers based on instructions stored in a memory of a computing device and operable on a processor of the computing device, the method comprising:
   creating a Bayesian network based on the data corresponding to the plurality of customers, the Bayesian network depicting probabilistic relationships among the data corresponding to a customer of the plurality of customers;
   performing conditional and maximum queries on the Bayesian network, the queries including posterior marginals, a probability of evidence, a most probable explanation, and a maximum a posteriori hypothesis, wherein:
      the posterior marginals are defined as a belief (bel($X_i$)) that, for every $X_i$ not in the data corresponding to the plurality of customers, is defined by:

$$bel(X_i) = P_\beta(X_i \mid e)$$
$$\text{where } P_\beta(X_i \mid e) = \sum_{X-X_i} \prod_j P(X_j \mid X_{pa_j}, e),$$

wherein e consists of an assignment of evidence E, X consists of the data corresponding to the plurality of customers, $X_{pa_j}$ consists of parent nodes of $X_j$, and $P_\beta(\bullet)$ consists of a probability associated with a Bayesian network $\beta$,
      the probability of evidence ($P_\beta(E=e)$) is defined as:

$$P_\beta(E = e) = \sum_X \prod_j P(X_j \mid X_{pa_j}, e),$$

the most probable explanation is defined as:
      an assignment $[x^0 = (x_1^0, \ldots, x_n^0)]$ satisfying
         $x^0 = \arg\max_x P_\beta = \arg\max_x \Pi_j P(X_j \mid X_{pa_j}, e)$, and
   the maximum a posteriori hypothesis is defined as an assignment $a^0 = (a_1^0, \ldots, a_k^0)$ given the data corresponding to the plurality of customers $A = \{A_1, \ldots, A_K\}$, $A \Pi X$ and:

$$a^0 = \arg\max_A \sum_{X-A} P(X \mid e) = \arg\max_A \sum_{X-A} \prod_j P(X_j \mid X_{pa_j}, e);$$

discovering cross device and cross channel variables for the customer within the data corresponding to the plurality of customers A based on the Bayesian network by:
      determining a first-level Markov blanket for A that includes deterministic customer data of the data corresponding to the plurality of customers, and
      determining a second-level Markov blanket for each node of the first-level Markov Blanket, the second-level Markov blanket consisting of probabilistic data that match the deterministic customer data; and
   assigning the universal identification to nodes including behaviors and data points that match the customer within the second-level Markov blanket based on the Bayesian network.

2. The method of claim 1, wherein the data corresponding to the plurality of customers includes one or more of first party data and third party data;
   the first party data including one or more of a customer profile, preferences, habits and behaviors, and channel data;
      the customer profile including one or more of a customer name and account information for a particular merchant at a merchant digital content system,
      the preferences including one or more of a customer's purchase history with a merchant, a wish list, cookie data, bid requests or responses, and social likes between a customer and a merchant,
      the habits and behaviors including one or more of a customer and/or merchant location, a wireless service set identifier (SSID), and a data analysis performed by a merchant on customer data, and
      the channel data including one or more of customer/merchant commerce data, customer relationship management data, and social media data; and
   the third party data including one or more of application marketplace data and social media data.

3. The method of claim 2, wherein the Bayesian network includes a directed acyclic graph, the directed acyclic graph including a plurality of edges and nodes, each node consisting of a set of data from a common source, and each node including a conditional probability table.

4. The method of claim 3, wherein creating the directed acyclic graph includes binning the data corresponding to a plurality of customers.

5. The method of claim 4, wherein the directed acyclic graph has a maximum posterior probability on all possible networks conditioned on the data corresponding to the plurality of customers.

6. The method of claim 5, wherein creating the directed acyclic graph includes building the conditional probability tables for each node, the conditional probability tables including a joint probability distribution for all variables in the data corresponding to the plurality of customers, and converting the joint probability distribution to conditional probabilities for each dependent variable of the data corresponding to the plurality of customers.

7. The method of claim 6, further comprising recording the directed acyclic graph and associated conditional probability tables, analyzing the directed acyclic graph and conditional probability tables using a machine learning program, and forming hypotheses regarding the data corresponding to the plurality of customers.

8. The method of claim 7, wherein finding matching behaviors and data points within the data corresponding to the plurality of customers based on the Bayesian network includes recognizing one or more patterns within the data corresponding to the plurality of customers using a support vector machine, using the support vector machine to classify the deterministic customer data of the data corresponding to the plurality of customers, and classifying the probabilistic data that matches the deterministic customer data.

* * * * *